(12) United States Patent
Matsukawa et al.

(10) Patent No.: US 10,101,726 B2
(45) Date of Patent: Oct. 16, 2018

(54) AUTONOMOUS CONTROL SYSTEM

(71) Applicant: FANUC Corporation, Yamanashi (JP)

(72) Inventors: Toshinori Matsukawa, Yamanashi (JP); Shinya Nakamura, Yamanashi (JP); Hideaki Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 327 days.

(21) Appl. No.: 14/927,515

(22) Filed: Oct. 30, 2015

(65) Prior Publication Data

US 2016/0124422 A1 May 5, 2016

(30) Foreign Application Priority Data

Oct. 31, 2014 (JP) .................. 2014-222259

(51) Int. Cl.
G05B 19/408 (2006.01)
G05B 19/4061 (2006.01)

(52) U.S. Cl.
CPC .............. *G05B 19/4061* (2013.01); *G05B 2219/49157* (2013.01)

(58) Field of Classification Search
CPC ....... G05B 19/4061; G05B 2219/49157; B25J 9/1666
USPC ............................................... 700/169
See application file for complete search history.

(56) References Cited

U.S. PATENT DOCUMENTS

| | | | | |
|---|---|---|---|---|
| 6,212,444 B1* | 4/2001 | Kato | ...................... | B25J 9/1666 700/245 |
| 6,401,011 B1* | 6/2002 | Hashimukai | ........... | B25J 9/1682 29/430 |
| 7,937,186 B2* | 5/2011 | Nagatsuka | ............. | B25J 9/1682 318/568.13 |
| 2012/0265342 A1* | 10/2012 | Kumiya | ................ | B25J 9/1676 700/255 |

FOREIGN PATENT DOCUMENTS

| | | | |
|---|---|---|---|
| JP | 62-264852 A | 11/1987 |
| JP | H06-28019 A | 2/1994 |
| JP | 8-166809 A | 6/1996 |
| JP | 8-263115 A | 10/1996 |

(Continued)

OTHER PUBLICATIONS

Decision to Grant a Patent in JP Application No. 2014-222259, dated Sep. 20, 2016.

*Primary Examiner* — Kenneth M Lo
*Assistant Examiner* — Sivalingam Sivanesan
(74) *Attorney, Agent, or Firm* — Hauptman Ham, LLP

(57) ABSTRACT

An autonomous control system having a numerical control device configured to perform machining operation by driving control of an item in a machining tool and an external device, the numerical control device includes a configuration data storing unit configured to store configuration data representing configuration of the item, and a machining program looking-ahead processing unit configured to generate item disposition data, and the external device includes a work information storing unit, an interference determination processing unit configured to command start of operation of the external device at time when the operation of the external device does not interfere with the item driven in the machining tool.

9 Claims, 10 Drawing Sheets

(56) References Cited

FOREIGN PATENT DOCUMENTS

| | | |
|---|---|---|
| JP | 10-3308 A | 1/1998 |
| JP | 2004-280635 A | 10/2004 |
| JP | 2010-244256 A | 10/2010 |

* cited by examiner

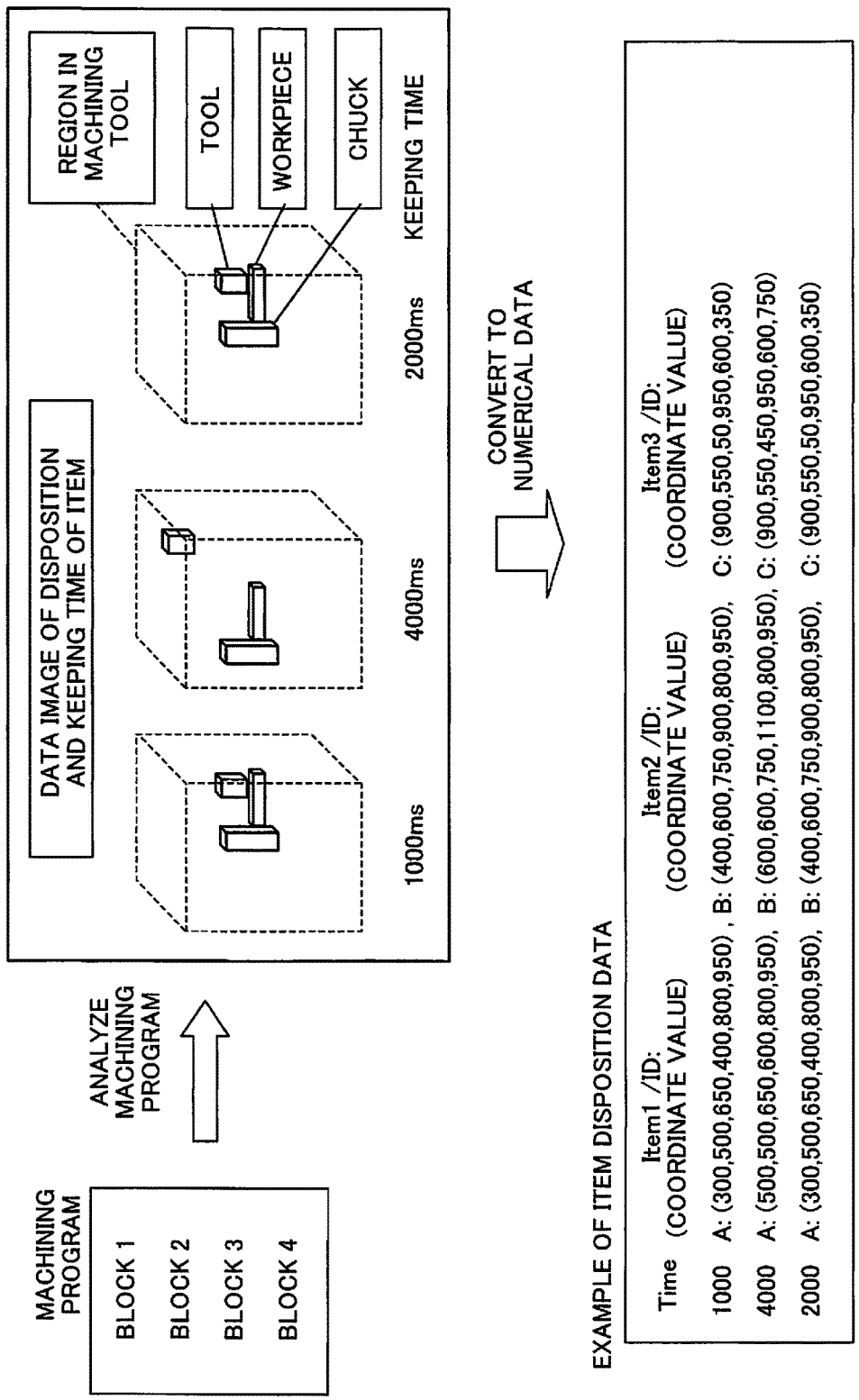

SPACE IN MACHINING TOOL IS MODELED AS SET OF PLURAL REGIONS DIVIDED IN 3-DIMENSIONAL GRID

ITEM DISPOSITION AND OCCUPIED SPACE ARE REPRESENTED USING IDENTIFICATION INFORMATION AND COORDINATE VALUE OF REGION OCCUPIED BY ITEM

REFERENCE COORDINATE IS TRANSFERRED BETWEEN NUMERICAL CONTROL DEVICE AND EXTERNAL DEVICE

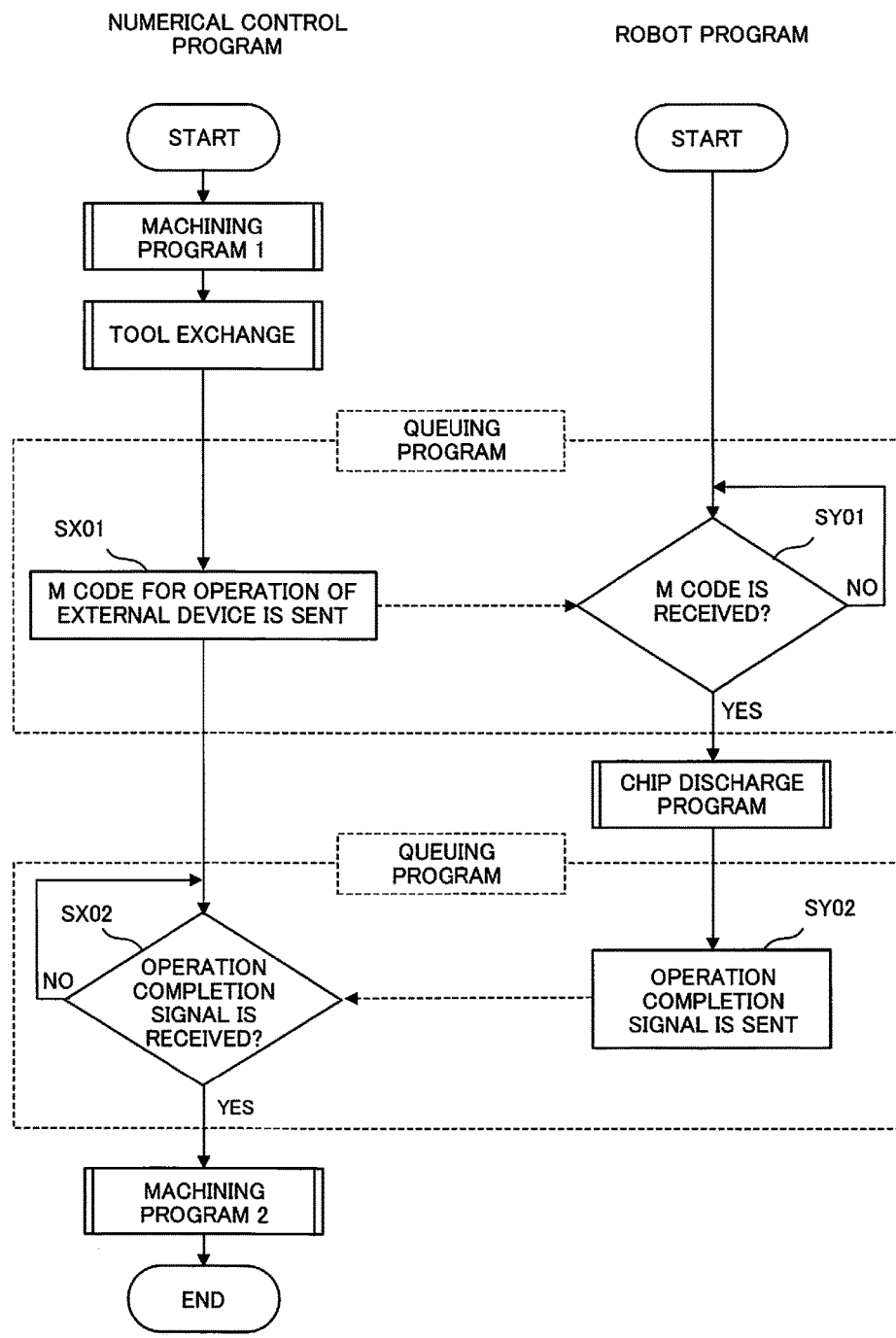

AUTONOMOUS CONTROL SYSTEM

RELATED APPLICATIONS

The present application claims priority to Japanese Application Number 2014-222259, filed Oct. 31, 2014, the disclosure of which is hereby incorporated by reference herein in its entirety.

BACKGROUND OF THE INVENTION

1. Field of the Invention

The invention relates to an autonomous control system enabling autonomous interlocking of an external device with a machining tool when the external device of the machining tool operates interlocking with the machining tool.

2. Description of the Related Art

Heretofore, in order to judging time to prevent the item in the machining tool such as a workpiece, a tool, a chuck, from interfering with the external device, queuing program by M code" is inserted into the program of the numerical control device of the machining tool and the external device, to prevent the interference of the two, when the machining tool operates interlocking with the external device, (for example, Japanese Patent Laid-Open No. 06-028019, Japanese Patent Laid-Open No. 62-264852).

M code is a group of signals to be used for commanding arbitrary operation from the machining tool to the external device in the queuing control.

FIG. 12 is a flowchart illustrating operation of a machining tool in queuing control in the prior art.

[Step SX01] After the machining by the machining program 1 is completed and the tool is exchanged, the machining tool sends M code signal to the external device at the time when the external device is to be operated before the time to executed the next machining program 2, and waits until the operation completion signal is received from the external device.

[Step SX02] The machining tool shifts to the machining by the machining program 2.

The flow of the operation of the external device in the queuing control is as follows.

[Step SY01] The external device waits until the M code signal is received from the machining tool, and starts the operation (such as chip discharge).

[Step SY02] The external device sends operation completion signal to the machining tool when the operation is completed.

However, in the prior art, there is a problem that it requires cost for the operator to generate queuing program since it is necessary to insert M code program to each program of the numerical control device and the external device for interlocking the machining tool and the external device. In addition to that, there is a problem that operation of the operator to correspond to influence of change of program to the program of the external device, when occurrence of change of the program in the machining program side requires corresponding change of the program in the external device, since the machining program and the program in the external device should be generated as a pair.

SUMMARY OF THE INVENTION

In view of the above-described problems in the prior art techniques, a purpose of the present invention is to provide an autonomous control system enables the external device to autonomously interlock with the machining tool when the external device of the machining tool operates interlocking with the machining tool.

An autonomous control system according to the present invention has a numerical control device configured to perform machining operation by driving control of an item in a machining tool based on machining program and an external device configured to operate interlocking with the machining operation of the machining tool, the numerical control device includes a configuration data storing unit configured to store configuration data representing configuration of the item, a machining program looking-ahead processing unit configured to generate item disposition data including disposition of the item in the machining tool of the machining tool and holding time for the disposition of the item, based on the machining program and the configuration data, and a data output unit configured to output the item disposition data, and the external device includes a work information storing unit configured to store space data including information of work space occupied and work time required when the external device works in association with each other, an interference determination processing unit configured to command start of operation of the external device at time when the operation of the external device does not interfere with the item driven in the machining tool, based on the item disposition data output by the data output unit, the space data, and the work time, and a program execution unit configured to start the operation of the external device based on the command from the interference determination processing unit.

The machining program looking-ahead processing unit may read the machining program before machining is performed and generate the item disposition data before the machining operation, and the data output unit may output the item disposition data in synchronization with the machining operation based on the machining program.

The work time of the external device may be sum of time required for work of the external device and margin time.

An internal clock of the numerical control device and an internal clock of the external device may be set to same time, and the holding time may be defined as time range.

The configuration data and reference point of the configuration data may be shared by the numerical control device and the external device in advance, and the disposition of the item included in the item disposition data is defined using the reference point of the configuration data.

Space in the machining tool may be modeled as a set of a plurality of regions divided by grid, the numerical control device and the external device share coordinate information representing position and space range of the plurality of regions in advance, and the disposition of the item included in the item disposition data is defined by the coordinate data in a region where the item interferes.

The configuration data representing the configuration of the item may be polygon type configuration data representing three dimensional configuration of the item, and the item disposition data, and the space data may be defined using data of three dimensional coordinate system.

The present invention, with the above configuration, makes queuing program by the operator unnecessary, and change of program of the external device is unnecessary even when the machining program is changed, such that operation cost by the operator is decreased.

BRIEF DESCRIPTION OF THE DRAWINGS

The above-described object, the other object, and the feature of the invention will be proved from the description of embodiments below with reference to the accompanying drawings. In these drawings:

FIG. 4 is item disposition data according to the present invention.

FIG. 12 is a flowchart illustrating operation of a machining tool in queuing control in the prior art.

DETAILED DESCRIPTION OF THE PREFERRED EMBODIMENTS

Autonomous control technique of the external device according to the present invention is outlined first.

A numerical control device according to the present invention looks ahead the content of the machining program, generates data storing data representing disposition of an item in the machining tool and time to keep the disposition and sends the data to the external device, to generate the machining program. In addition to that, the external device compares the data provided by the numerical control device and operation range and operation time of the external device, and operates at the time when operable time is secured, to execute autonomous control.

By introducing this method, operation interlocking the machining tool and the robot by program which does not require queuing control using M code or the like compared to the prior art is implemented, as shown in the schematic flowchart of the present invention.

Figure 1:
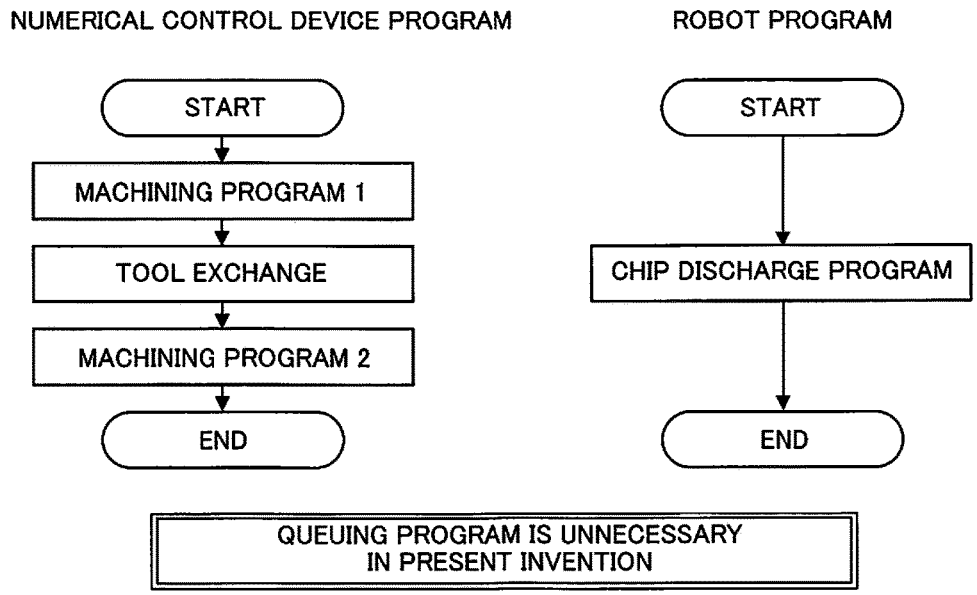
FIG. 1 is a schematic diagram illustrating autonomous control technique of an external device according to the present invention.
Figure 3:
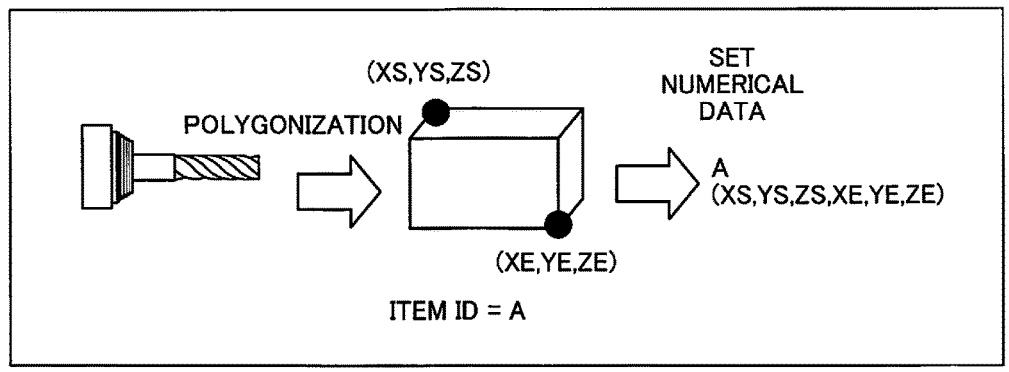
FIG. 3 is polygon form data according to the present invention.
Figure 2:
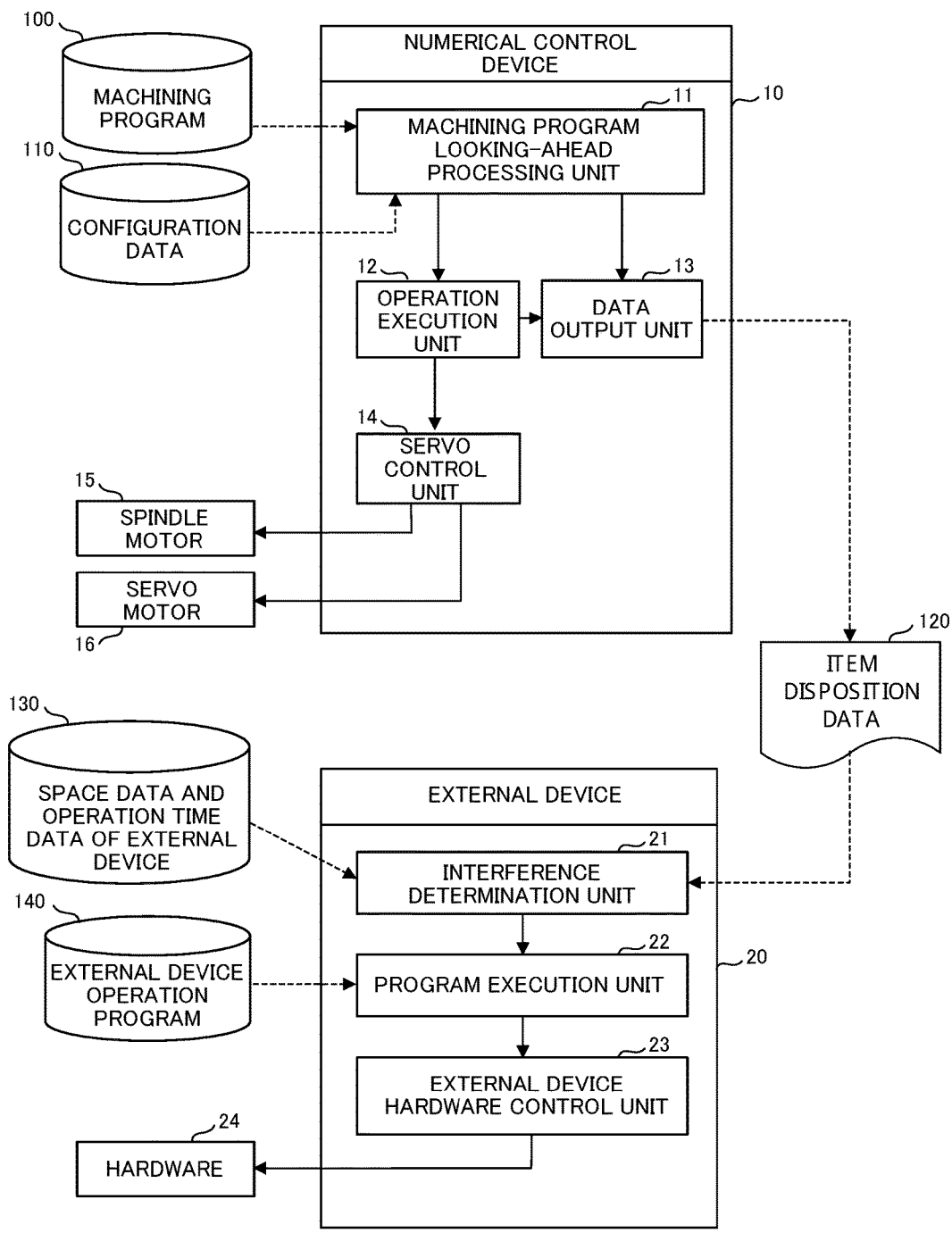
FIG. 2 is a schematic block diagram of an autonomous control system consisting of a numerical control device and an external device according to the present invention.

FIG. 2 is a schematic block diagram of an autonomous control system consisting of a numerical control device and an external device according to an embodiment of the present invention. The numerical control device 10 in the present invention consists of a machining program looking-ahead processing unit 11, an operation execution unit 12, a data output unit 13, a servo control unit 14.

The machining program looking-ahead processing unit 11 looks ahead and analyzes the machining program 100 stored in a memory (not shown in the figure) provided in the numerical control device 10 before machining operation based on the machining program 100 is performed, and generates item disposition data 120 which is the data of the location where each item of the machining tool to be operated during machining operation by the machining program 100 is disposed.

In the generation processing of the item disposition data 120 by the machining program looking-ahead processing unit 11, in addition to the machining program 100, configuration data of item occupying a part of inner region of the machining tool such as a tool, a workpiece, and a chuck, used in the machining tool to be controlled, are used. The configuration data of these items are generated as, for example, data with configuration of the item by the polygon, and set in memory (not shown in the figure) or the like of the numerical control device 10 in association with unique ID of each item before machining operation by the machining program is started.

As an example of the configuration data of the item using the polygon, a rectangular solid which can store the item therein may be used, and by adopting this kind of simple configuration, the numerical control device 1 and the external device 20 with low calculation capability can quickly calculate the disposition of the items. It should be noted that, for the item which changes its direction to the coordinate axes or the item which changes its configuration, the rectangular solid may be formed in a size in which the item can be stored even when the item changes its direction and its configuration.

The machining program looking-ahead processing unit 11, as shown in FIG. 4, analyzes the machining program 100 to calculate coordinate position of each item in the machining tool and time to keep the coordinate position of each item in the machining tool, for generating item disposition data 120 in which the time to keep the item disposition and the coordinate position information of each item are associated with each other. The item disposition data 120 is generated each time when the item disposition is changed.

The generated item disposition data 120 is output through a data output unit 13 to the external device. The output of the item disposition data 120 is output to the external device without being delayed to the machining operation by the machining program which generates the item disposition data 120.

The output of the item disposition data 120 by the data output unit 13 is performed synchronizing with the machining operation by the machining program 100 in the operation execution unit 12.

The operation execution unit 12 reads the machining program through the machining program looking-ahead processing unit 11, and generates command data for a spindle motor 15, a servo motor 16, and the like, based on the machining program. The servo control unit 14 receives the command data output by the operation execution unit 12 and controls the spindle motor 15, the servo motor 16, and the like, based on the command data.

The external device 20 in the present embodiment includes an interference determination unit 21, a program execution unit 22, and an external device hardware control unit 23.

The interference determination unit 21 receives the item disposition data 120 output by the data output unit 13, determines whether position of each item in the machining tool stored in the item disposition data 120 interferes with motion of the external device itself, and outputs the command of execution of program to the program execution unit 22 at the time when the position does not interference with the motion.

Figure 5:
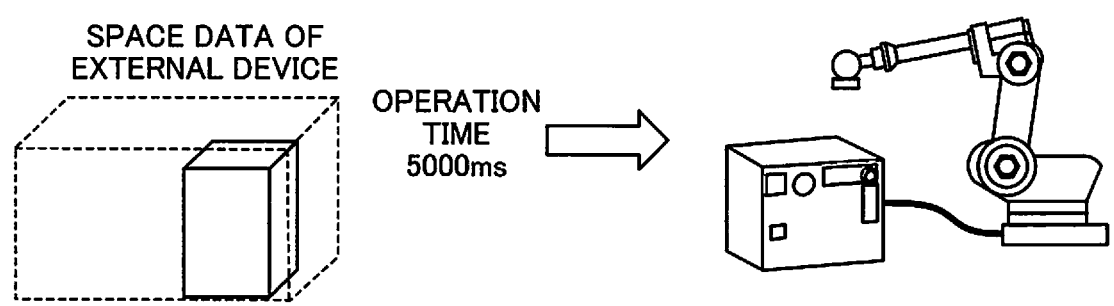
FIG. 5 is space data of an external device according to the present invention.

In the determination processing of the determination by the interference determination unit 21, in addition to the item disposition data 120 received from the data output unit 13, space data in the machining tool where the external device itself occupies as an operation region when external device operation program 140 is executed and data of execution time from the start to the end of the external device operation program 140. FIG. 5 shows an example of the space data of the external device represented in three dimensional space and the data of the execution time. The data are set in a memory (not shown in the figure) of the external device in advance by the designer of the external device. It should be noted that the execution time may be set with time margin such that the external device does not interfere with the machining tool even when starting time of execution of the numerical control is delayed to a certain extent.

The interference determination unit 21 assumes that each item is disposed in the order set in the item disposition data 120 in the machining tool after the interference determination unit 21 receives the item disposition data 120. Then the interference determination unit 21 extracts a time zone in which operation time of each item and operation time of the external device do not interfere with each other based on the disposition of the configuration data set in the item disposition data 120 and the space data of the external device, and determines that the external device operation program can be started when the extracted time zone is longer than the operation time of the external device.

Figure 6:
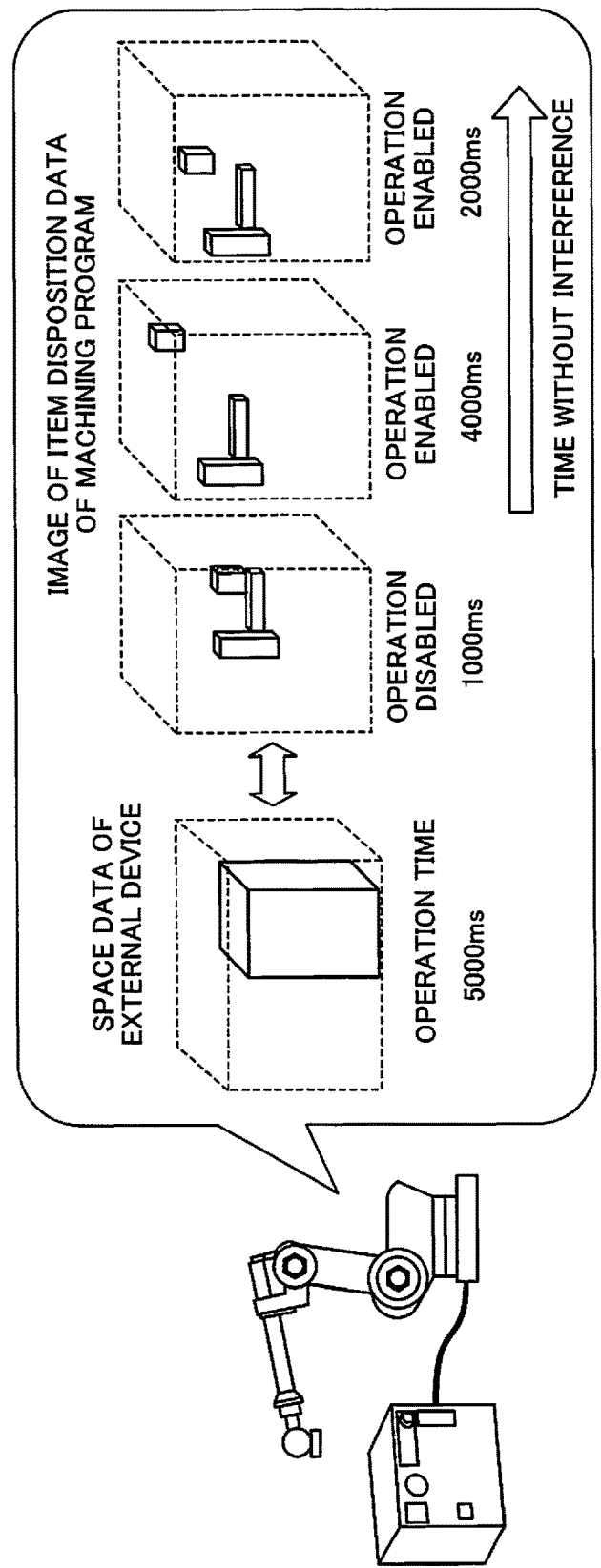
FIG. 6 is a schematic diagram of interference determination processing according to the present invention.

FIG. 6 shows processing in with the interference determination unit 21 determines whether the disposition of each item in the machining tool interferes with the motion of the external device itself or not, based on the item disposition data 120 and the space data and the data of operation time of the external device. In FIG. 6, it is determined that the external device operation program can not be started since disposition of each item shown in the first item disposition data 120 interferes with the operation space of the external device, but it is determined that the external device operation program can be started after 1000 ms and the command of execution of the program is output to the program execution unit 22 after 1000 ms, since disposition of each item set in the second and third item disposition data 120 does not interfere with the operation space of the external device, and the state in which the interference does not occur continues at least 6000 ms considering the keeping time of the item, which is longer than the 5000 ms of the operation time of the external device.

The program execution unit 22 receives the command of execution of the program from the interference determination unit 21 and executes the external device operation program 140 to generate and output command data for hardware 24 including a robot arm. The external device hardware control unit 23 receives the command data output by the program execution unit 22 and controls the hardware 24 including the robot arm based on the command data.

Figure 7:
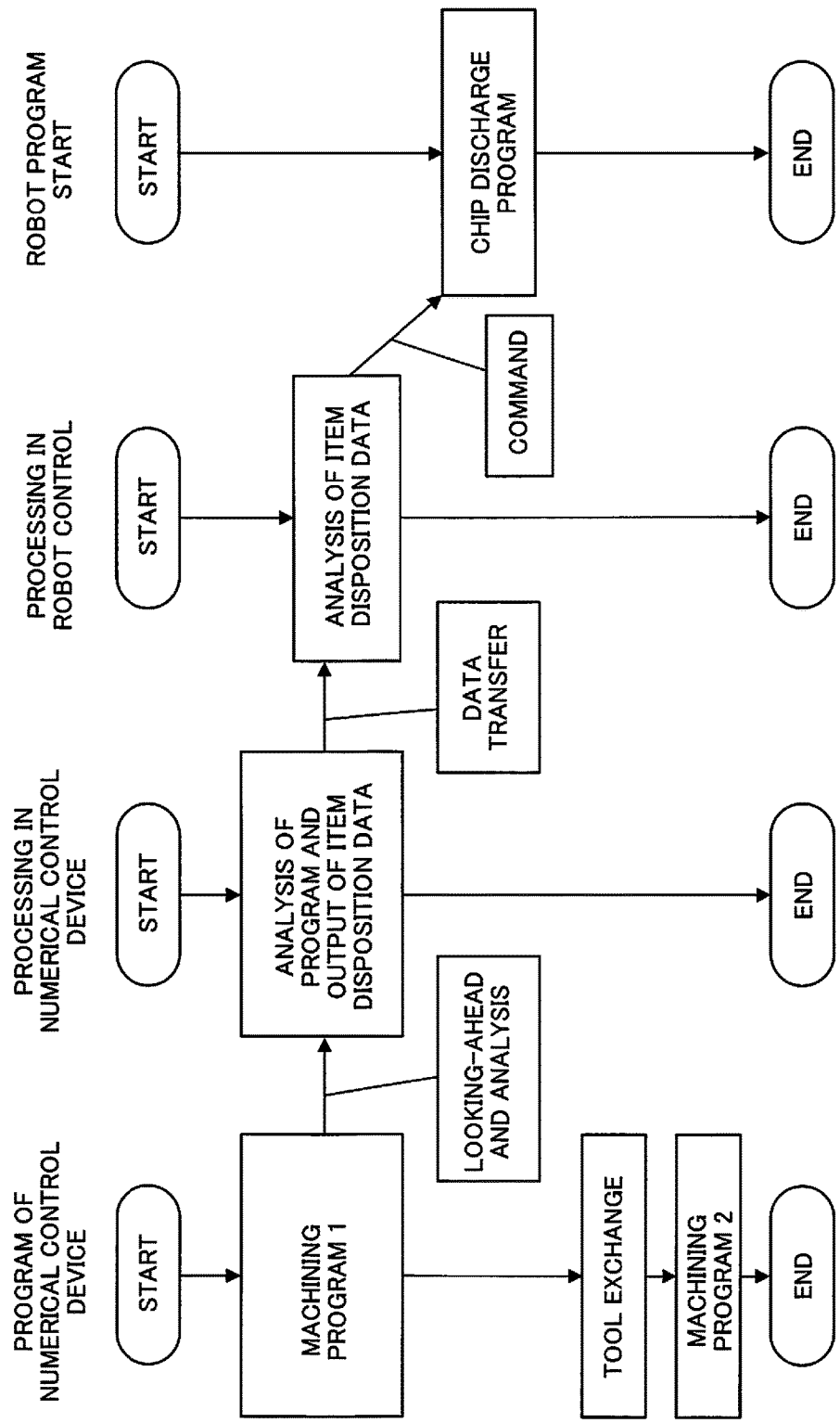
FIG. 7 is a sequence diagram of each process to be executed in a numerical control device and in an external device according to the present invention.

FIG. 7 shows a sequence diagram of each process to be executed in the numerical control device 10 and in a chip discharge robot as the external device 20 according to the present embodiment. As shown in the figure, the item disposition data 120 is generated based on the machining program looked ahead and output to the external device when the machining operation by the machining program is performed. Then the external device 20 analyzes the acquired item disposition data 120 and starts robot program at the time when the interference does not occur. Thus, on the chip discharge robot side, start time of the robot program can be autonomously determined without executing queuing processing.

Figure 8:
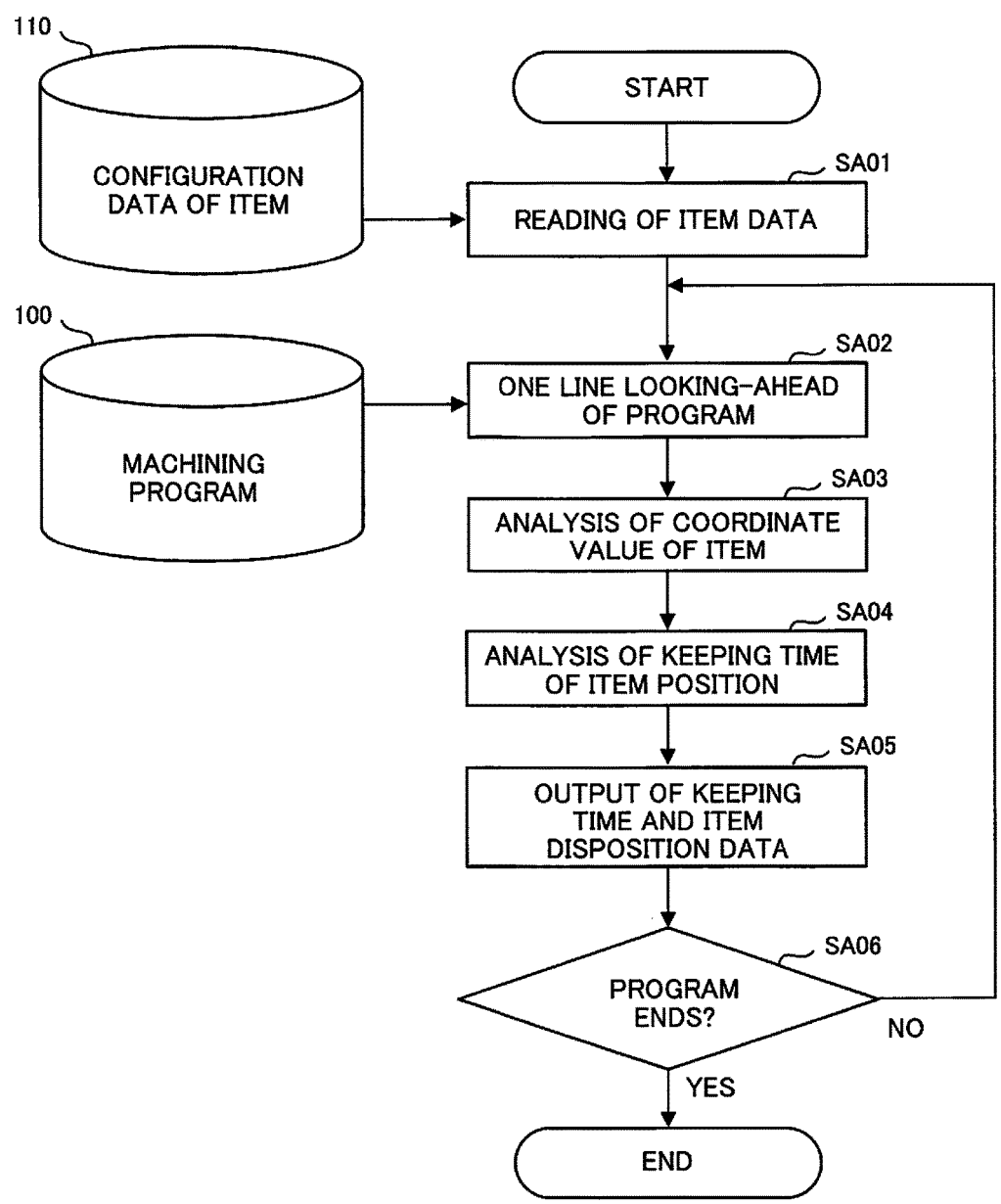
FIG. 8 is a schematic flowchart of process executed by a machining program looking-ahead processing unit.

FIG. 8 is a schematic flowchart of process executed by the machining program looking-ahead processing unit 11 in the present embodiment.

[Step SA01] Configuration data of the item used in the machining tool is read.

[Step SA02] One line of the machining program 100 is looked ahead.

[Step SA03] The machining program 100 is analyzed and the coordinate value of each item used in the machining in the machining tool is calculated.

[Step SA04] The machining program 100 is analyzed and the keeping time of the coordinate position of each item calculated in Step SA03 is calculated.

[Step SA05] The item disposition data 120 is generated based on the coordinate position of each item calculated in Step SA03 and the keeping time calculated in Step SA04.

[Step SA06] It is determined whether the machining program 100 is looked ahead to the end of the program. The process ends when the machining program 100 is looked ahead to the end of the program, while the process returns to Step SA02 when a program line remains to be looked ahead.

Figure 9:
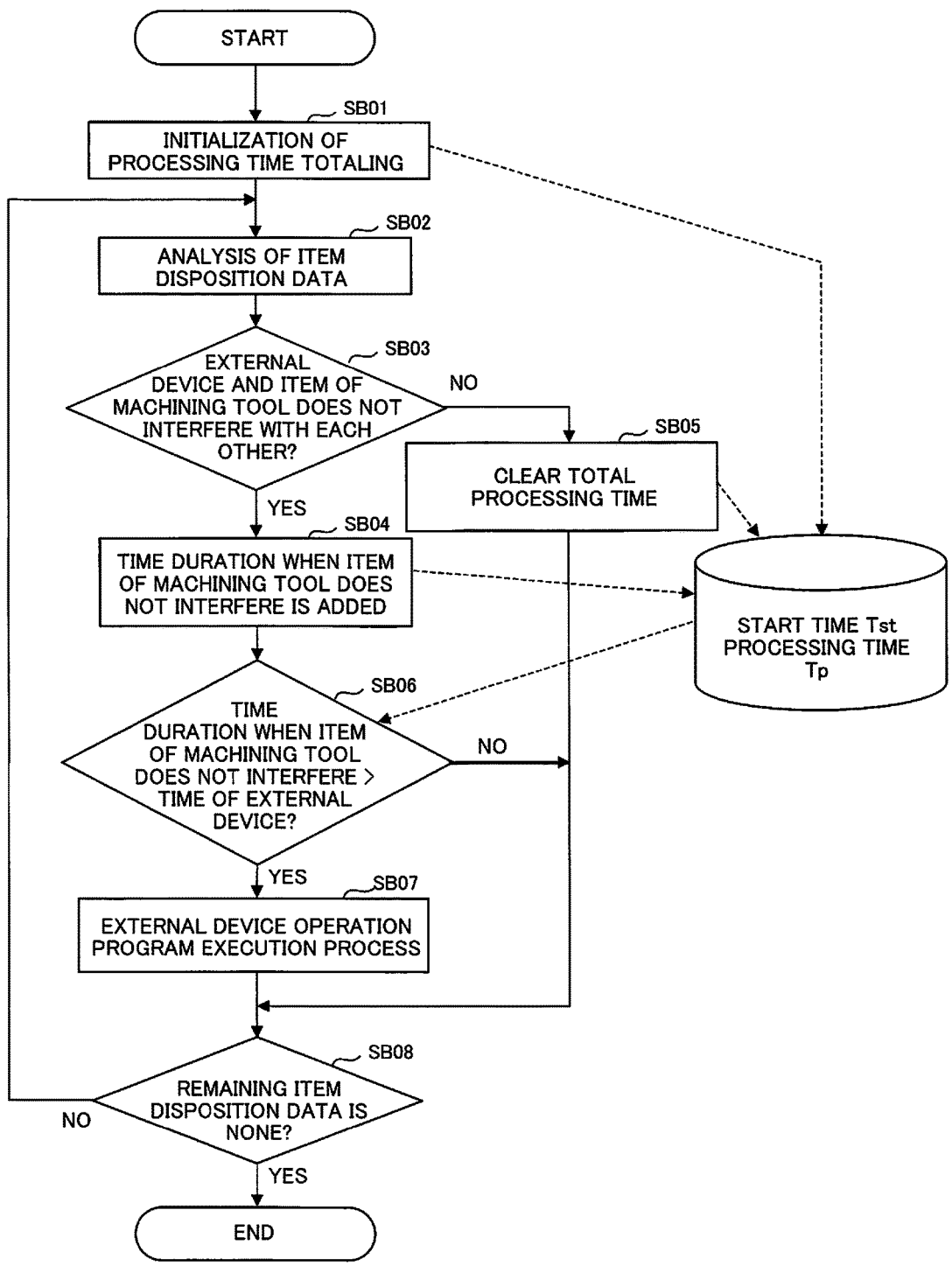
FIG. 9 is a schematic flowchart of process executed by an interference determination processing unit.

FIG. 9 is a schematic flowchart of process executed by the interference determination processing unit 21 in the present embodiment.

[Step SB01] Start time Tst which is a variable representing time to start the external device operation program, and processing time Tp which is a variable representing accumulated time in which each item in the machining tool and the operation region of the external device 20 do not interfere with each other, are initialized to be zero.

[Step SB02] Positional relation between each item in the machining tool and the operation region of the external device 20 is analyzed based on the item disposition data 120 received from the numerical control device 10 and the space data of the external device 20.

[Step SB03] It is determined whether the disposition of each item set in the analyzed item disposition data 120 interferes with the operation region of the external device 20 or not based on the result of the analysis in the Step SA01. The process proceeds to Step SB04 when the disposition of each item does not interfere with the operation region, and proceeds to Step SB05 when the disposition of each item interferes with the operation region.

[Step SB04] The keeping time of the analyzed item disposition data 120 is added to the processing time Tp.

[Step SB05] The processing time Tp is cleared after the processing time Tp is inserted to the start time Tst.

[Step SB06] It is determined whether the processing time Tp is longer than the operation time of the external device 20 or not. The process proceeds to Step SB07 when the processing time Tp is longer than the operation time of the external device 20, and proceeds to Step SB08 when the processing time Tp is not longer than the operation time of the external device 20.

[Step SB07] Task is set to start the external device operation program after the start time Tst. The external device operation program is immediately started when the start time Tst is zero.

[Step SB08] It is determined whether the next item disposition data 120 remains or not. The process ends when the next item disposition data 120 does not remain, and the process returns to Step SB02 when the next item disposition data 120 remains.

The embodiments of the present invention are described as above. However, the present invention is not limited to the above described embodiments, but the present invention can be, by changing the embodiments, implemented in the other embodiments. For example, in the above described embodiments, polygon configuration of simple rectangular solid is used as the configuration data to be used for the generation of the item disposition data 120, however, polygon configuration more similar to the item configuration may be used when calculation capability of three dimensional data in the numerical control device 10 and in the operation unit of the external device 20 is high enough.

The numerical control device 10 and the external device 20 may share coordinate position of each region in advance by modeling the space in the machining tool as a set of a plurality of regions divided by grid, and identification information or coordinate position of all regions in which the item interferes, instead of the item disposition data 120, may be notified to the external device.

Figure 10:
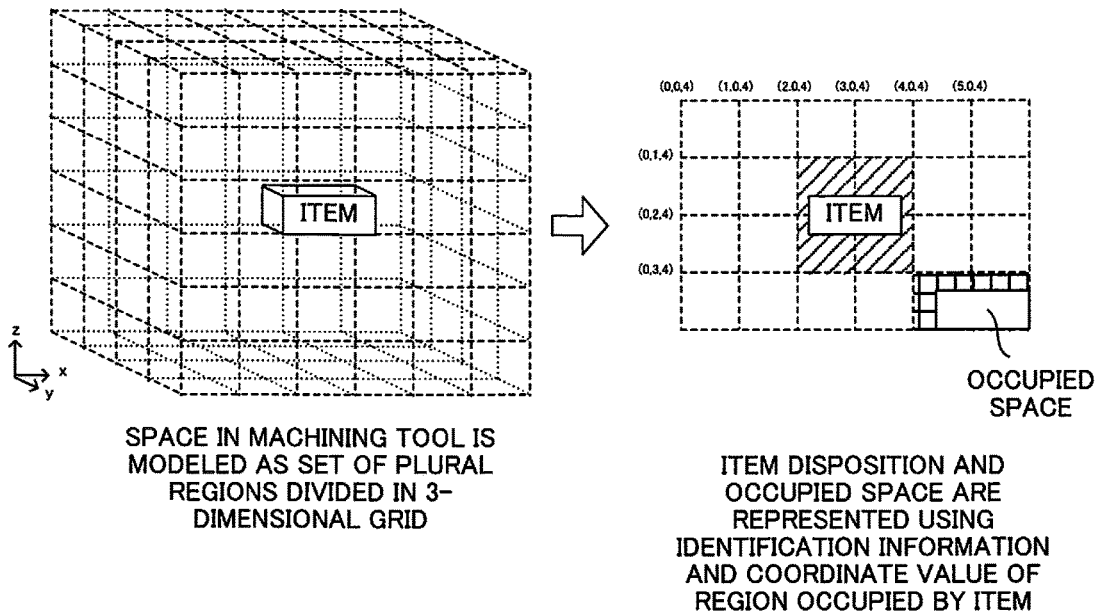
FIG. 10 is a diagram illustrating data expression using grid model according to an embodiment of the present invention.

For example, if the item is included in four cubes of fourth column from the bottom as shown in the right side in FIG. 10 when the space in the machining tool is modeled as a set of cubes divided by three dimensional grid as shown in the left side in FIG. 10, the numerical control device 10 transmits the coordinate position of the four cubes as the item disposition data to the external device 20. In addition to that, when the identification information or the coordinate position of cubes (i.e. the lower right two cubes in the perpendicular direction in the right side in FIG. 10) with which the occupied space by the operation of the external device 20 interferes is stored in advance, it can be easily determined whether the item in the machining tool and the operation space of the external device 20 interfere with each other only by determining whether the item disposition data 120 and the space data include same cube or not.

Figure 11:
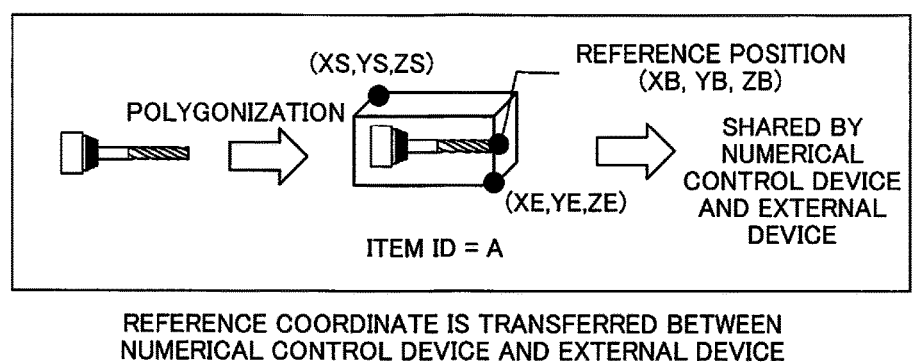
FIG. 11 is a diagram illustrating data expression using reference position of an item according to an embodiment of the present invention.

When the configuration data of the item and the reference position of the configuration of the item are shared by the numerical control device 10 and the external device 20 as shown in FIG. 11, simplification of the data may be implemented by sending only the reference position of the item to the item configuration data which is sent from the numerical control device 10 to the external device 20 at the time of executing the machining program.

In addition to that, when time of an internal clock of the numerical control device 10 and time of an internal clock of the external device 20 are adjusted to be set to designate the same time, including manually adjusting, adjusting in a NTP server respectively connecting the numerical control device 10 and the external device 20 to the network, and automatically adjusting by adopting radio wave clock, the keeping time in the item disposition data 120 may be designated as the time range. In this way, since the external device 20 can analyze the disposition of the item in the machining tool as range of absolute time, the item disposition data 120 is not necessarily sent in synchronization with the machining operation by the operation execution unit 12, and, for example, all item disposition data 120 of the machining process to be executed may be generated and sent in advance and the start time of the external device operation program may be more systematically determined on the external device 20 side.

In the embodiments of the present invention, the configuration of the item in the machining tool, the disposition of the item, the space data occupied by the external device 20, the space model in the machining tool, and the like, are described based on the example in which the space is represented using three dimensional data. However, the configuration of the item in the machining tool, the disposition of the item, the space occupied by the external device 20, and the space model in the machining tool may be represented using two dimensional data when the item in the machining tool and the hardware of the external device operates only in two dimensional directions such as X-Y coordinates. In the machining tool, enough advantages of the present invention are implemented even when each data is represented as two dimensional data, and the processing in the numerical control device 10 and the operation unit of the external device 20 can be remarkably reduced.

The invention claimed is:

1. An autonomous control system, comprising:
a numerical control device configured to perform machining operation by driving control of an item in a machining tool based on a machining program; and
an external device configured to operate interlocking with the machining operation of the machining tool,
the numerical control device comprising:
    a configuration data storing unit configured to store configuration data representing configuration of the item;
    a machining program looking-ahead processing unit configured to generate item disposition data including disposition of the item in the machining tool of the machining tool and holding time for the disposition of the item, based on the machining program and the configuration data; and
    a data output unit configured to output the item disposition data; and
the external device comprising:
    a work information storing unit configured to store (i) space data including information of work space occupied and (ii) work time required when the external device works, wherein the space data and the work time are stored in association with each other;
    an interference determination processing unit configured to command start of operation of the external device at time when the operation of the external device does not interfere with the item driven in the machining tool, based on the item disposition data output by the data output unit, the space data, and the work time; and a program execution unit configured to start the operation of the external device based on the command from the interference determination processing unit.

2. An autonomous control system according to claim 1, wherein
the machining program looking-ahead processing unit is configured to read the machining program before machining is performed and generate the item disposition data before the machining operation, and
the data output unit is configured to output the item disposition data in synchronization with the machining operation based on the machining program.

3. An autonomous control system according to claim 1, wherein the work time of the external device is sum of time required for work of the external device and margin time.

4. An autonomous control system according to claim 1, wherein
an internal clock of the numerical control device and an internal clock of the external device are set to same time, and
the holding time is defined as time range.

5. An autonomous control system according to claim 1, wherein
the configuration data and reference point of the configuration data are shared by the numerical control device and the external device in advance, and
the disposition of the item included in the item disposition data is defined using the reference point of the configuration data.

6. An autonomous control system according to claim 1, wherein
a space in the machining tool is modeled as a set of a plurality of regions divided by a grid,
the numerical control device and the external device share coordinate information representing positions and space ranges of the plurality of regions in advance, and
the disposition of the item included in the item disposition data is defined by coordinate data of a region, among the plurality of regions, where the item is located.

7. An autonomous control system according to claim 1, wherein
the configuration data representing the configuration of the item is polygon type configuration data representing a three dimensional configuration of the item, and
the item disposition data and the space data are defined using data of a three dimensional coordinate system.

8. An autonomous control system according to claim 1, wherein
the interference determination processing unit is configured to accumulate time during which the item and the external device do not interfere with each other.

9. An autonomous control system according to claim 8, wherein
the interference determination processing unit is configured to command the start of operation of the external device when the accumulated time is longer than the work time of the external device.

* * * * *